US011840606B2

(12) United States Patent
Branham et al.

(10) Patent No.: US 11,840,606 B2
(45) Date of Patent: Dec. 12, 2023

(54) BLOCKY POLY(ETHER ETHER KETONE) COPOLYMERS AND CORRESPONDING SYNTHESIS METHODS AND ARTICLES

(71) Applicants: SOLVAY SPECIALTY POLYMERS ITALY S.P.A., Bollate (IT); VIRGINIA TECH INTELLECTUAL PROPERTIES, INC., Blacksburg, VA (US)

(72) Inventors: Kelly D. Branham, Woodstock, GA (US); David B. Roller, Dunwoody Norcross, GA (US); Stéphane Jeol, Cumming, GA (US); Marco Apostolo, Senago (IT); Robert B. Moore, Blacksburg, VA (US); Lindsey Anderson, Blacksburg, VA (US); Samantha Talley, Blacksburg, VA (US); Xijing Yuan, Blacksburg, VA (US)

(73) Assignees: SOLVAY SPECIALTY POLYMERS ITALY S.P.A., Bollate (IT); VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/552,192

(22) Filed: Dec. 15, 2021

(65) Prior Publication Data

US 2022/0127419 A1 Apr. 28, 2022

Related U.S. Application Data

(63) Continuation of application No. 16/340,739, filed as application No. PCT/EP2017/075864 on Oct. 10, 2017, now abandoned.

(60) Provisional application No. 62/406,634, filed on Oct. 11, 2016.

(51) Int. Cl.
*C08G 65/48* (2006.01)
*C08G 65/40* (2006.01)

(52) U.S. Cl.
CPC ....... *C08G 65/485* (2013.01); *C08G 65/4018* (2013.01); *C08G 65/4056* (2013.01); *C08G 2650/40* (2013.01)

(58) Field of Classification Search
CPC ...... C08G 2261/516; C08G 2261/1452; C08G 2261/722; C08G 18/0828; C08G 75/23; C08G 75/20; H01B 1/122; H01M 8/1025; H01M 8/1027; C08L 81/06
See application file for complete search history.

(56) References Cited

U.S. PATENT DOCUMENTS

| 2004/0237786 | A1* | 12/2004 | Brown | B01D 67/0011 96/8 |
| 2011/0172317 | A1* | 7/2011 | Lehmann | B01D 71/68 210/500.21 |
| 2017/0253712 | A1* | 9/2017 | Moore | H01M 8/1025 |

* cited by examiner

*Primary Examiner* — Shane Fang
(74) *Attorney, Agent, or Firm* — Osha Bergman Watanabe & Burton LLP

(57) ABSTRACT

Described here are blocky PEEK copolymers and corresponding synthesis methods. It was surprisingly found that synthesis of blocky PEEK copolymers in a non-solvent environment with respect to PEEK produced blocky PEEK copolymers with high degrees of functionalization and crystallinity. The blocky PEEK copolymers had an increased blocky structure, relative to corresponding PEEK copolymer synthesized with other known methods. Moreover, membranes formed from the blocky PEEK polymers are particularly desirable in fuel cell applications. For example, the membranes formed from the blocky PEEK polymers had surprisingly large ion conductivities as well as significantly improved chemical and thermal resistance, at least in part, to the improved functionalization and crystallinity.

18 Claims, No Drawings

BLOCKY POLY(ETHER ETHER KETONE) COPOLYMERS AND CORRESPONDING SYNTHESIS METHODS AND ARTICLES

RELATED APPLICATION

This application claims priority to U.S. provisional application No. 62/406,634 filed on Oct. 11, 2016, the whole content of this application being incorporated herein by reference for all purposes.

FIELD OF THE INVENTION

The invention relates to blocky PEEK copolymers and methods for forming blocky PEEK copolymers. The invention also relates to membranes formed from the blocky PEEK copolymers.

BACKGROUND OF THE INVENTION

Proton exchange membranes fuel cells ("PEMFC") are attractive power sources in application settings such as vehicles and portable devices. Currently used membranes in PEMFC applications are based upon perfluorinated polymers such as Nafion® PFSA. While such membranes have good ionic conductivities, their long term stability is a concern and they have a relatively high cost of production.

Sulfonated poly(ether ether) ketone ("PEEK") polymers have been investigated as a replacement for perfluorinated polymer membranes in PEMFC applications. In general, randomly sulfonated PEEK based membranes have been investigated and have shown improved mechanical properties, thermal stability and conductivity, relative to their perfluorinated counterparts. While such membranes are promising, there is a continued desire to find membranes compositions having further improved mechanical performance, thermal stability, chemical resistance while having increased ion conductivity performance.

DETAILED DESCRIPTION OF THE INVENTION

Described herein are blocky functionalized PEEK copolymers and corresponding synthesis methods. It was surprisingly found that synthesis of blocky functionalized PEEK copolymers in a non-solvent environment with respect to PEEK produced blocky functionalized PEEK copolymers with high degrees of functionalization and crystallinity. The blocky functionalized PEEK copolymers had an increased blocky structure, relative to corresponding PEEK copolymer synthesized with other known methods. Membranes formed from the blocky functionalized PEEK copolymers are particularly desirable in fuel cell applications. For example, the membranes formed from the blocky functionalized PEEK copolymers, had surprisingly large ion conductivities as well as significantly improved chemical and thermal resistance, at least in part due to the simultaneously improved functionalization and crystallinity.

As used herein a "blocky" copolymer refers to a copolymer having a statistically significant sequence of the same recurring units. Random copolymers, on the other hand, have random statistical distributions of same recurring unit. The difference between a blocky copolymer and a "block" copolymer is largely one of degree. In general, for at least one recurring unit, a block copolymer has narrower distributions along the polymer backbone relative to the corresponding blocky copolymer (e.g. the local density of repeating sequences of the same recurring unit is larger in block copolymers. For example, a block copolymer containing -(A)- and -(B)- recurring units may have a structure such as A-A-A-A-A-A-A-A-A-A-A-B-B-B-B-B-B-B-B-B-B-B, a random copolymer may have a structure such as B-A-A-B-A-B-B-A-B-A-A-A-B-A-B-A-A-B-B-B, and a blocky copolymer may have a structure such as A-A-A-A-B-B-B-B-A-B-B-B-A-A-A-A-B-B). As used herein "functionalized" refers to the result of functionalization of the recurring unit -(A)- with a functionalization agent Y to generate a second recurring unit -(B)-. For the blocky functionalized PEEK copolymers described herein, the distribution of functionalized recurring units gives rise to a blocky copolymer architecture. For clarity, as used herein, a functionalized copolymer is a polymer that has at least 2 types of recurring units: non functionalized -(A)- and functionalized -(B)-, as described in more detail below.

It was surprisingly discovered that blocky functionalized PEEK copolymers with significantly improved degrees of functionalization, crystallinity and ion conductivities could be synthesized by functionalizing PEEK polymers, in a gel state ("PEEK gel"), in a non-solvent environment. As used herein, a PEEK gel refers to a PEEK polymer solution including a PEEK polymer and gel solvent that has a gelation temperature, at or below which, the PEEK polymer solution undergoes a transition to gel state. In some sense, the gel can be considered as an immobile polymer network having a mobile solvent component, though it should be kept in mind that the gel is a single phase system. As described in detail below, PEEK gels can be formed by dissolving PEEK in a selected solvent at a temperature above the gelation temperature, and reducing the temperature to allow the gel to form. Of course, not all PEEK solutions having PEEK polymer and solvent have gelation temperatures (not all such PEEK solutions form gels). Gel formation depends on the specific choice of solute, solvent and concentration such that the interaction between the solute and solvent has a temperature at which a gel forms. For the blocky functionalized PEEK copolymer described herein, desirable gel forming solvents are described below. PEEK gels are further described in PCT patent application publication number WO 2016/040293 ("the '293 application"), to Moore and entitled "Gelation Aerogel Formation and Reactions Thereof to Produce Non-Random Functionalization of Poly (Aryl Ether Ketones)," incorporated herein by reference.

The PEEK gels are functionalized in a non-solvent environment. As used herein, a non-solvent specifically refers to a non-solvent with respect to PEEK. The solubility of PEEK in the non-solvent is less than about 0.1 percent weight by volume ("w/v %") at the temperature at which the functionalization is performed. For clarity, w/v % refers to 100 times the number of grams of polymer (e.g. PEEK) per 100 mL of solvent or non-solvent. Preferably, the solubility of PEEK in the non-solvent is less than about 0.01 w/v % over the range of temperatures spanning the freezing point to the boiling point of the non-solvent. Furthermore, the non-solvent is selected so that it is a solvent for the functionalization agent at least at the functionalization temperature (the selected temperature at which the functionalization reaction is performed). Of course, the non-solvent can also be a solvent for the functionalization agent over a wider temperature range, for example, from room temperature to the boiling point of the non-solvent. The solubility of the functionalization agent in the non-solvent is at least about 50 g/L, preferably at least about 60 g/L and more preferably about 65 g/L at room temperature (25° C.). In some embodiments, the non-solvent is also miscible with the gel solvent. Desirable solvents are discussed in detail below. In some embodiments, the non-solvent environment is essentially free of a solvent for PEEK.

The synthesis methods described herein produce blocky functionalized PEEK copolymers with surprising high degrees of functionalization and crystallinity. In particular, the PEEK copolymers can have a high degree of functionalization while still able to crystallize. The blocky functionalized PEEK copolymers can have a degree of functionalization where the concentration of the recurring units that are functionalized, relative to those that are capable of functionalization by the same functionalization agent, is no less than about 20 mol % and can be up to about 40 mol %, while maintaining the crystallinity of PEEK of at least 10% to about 35%. It was also surprisingly discovered that the blocky functionalized PEEK copolymers having increased blocky structure in conjunction with increased functionalization have increased ion conductivities. For example, relative to the synthesis methods described in the '293 application describing the functionalization of PEEK gels in a solvent environment, the methods described herein incorporating a non-solvent environment allow for higher degrees of functionalization, crystallinities and blocky structure. In light of the aforementioned discovery, the blocky functionalized PEEK copolymers described herein also have increased ion conductivities relative to those described in the '293 application.

In some embodiments, the blocky functionalized PEEK copolymers described herein can be advantageously incorporated in membranes in application including, but not limited to, fuel cell membranes. The outstanding crystallinity translates into membranes having improved thermal resistance, chemical resistance and mechanical performance (tensile modulus, tensile strength). Additionally, the high degree of functionalization and blocky architecture translate into membranes having significantly improved ion conductivities. Accordingly, membranes made from the blocky functionalized PEEK copolymers described herein can be desirably used as fuel cell membranes, as well as in other application settings, as describe in detail below.

The Blocky Functionalized PEEK Copolymer

The polymer compositions include a blocky functionalized PEEK copolymer. The copolymer includes a combined concentration of recurring unit ($R_{PEEK}$) and recurring unit ($R^*_{PEEK}$) of at least about 50 mol %, relative to the total number of recurring units in the blocky functionalized PEEK copolymer. In some such embodiments, the copolymer includes a combined concentration of recurring unit ($R_{PEEK}$) and recurring unit ($R^*_{PEEK}$) of at least about 60 mol %, at least about 65 mol %, at least about 70 mol %, at least about 75 mol %, at least about 80 mol %, at least about 85 mol %, at least about 90 mol %, at least about 95 mol %, or at least about 99.9 mol %, relative to the number of recurring units in the blocky functionalized PEEK copolymer.

In some embodiments, the relative concentration of recurring unit ($R^*_{PEEK}$) is at least about 20 mol %, at least about 22 mol %, or at least than about 25 mol %, relative to the total number of recurring units ($R_{PEEK}$)+($R^*_{PEEK}$).

Relative concentration can be defined as:

$$100 * \frac{N(R^*_{PEEK})}{N(R_{PEEK}) + N(R^*_{PEEK})},$$

where $N(R^*_{PEEK})$ is the number recurring units ($R^*_{PEEK}$) and $N(R_{PEEK})$ is the number of recurring units ($R_{PEEK}$). In some such embodiments, the relative concentration of recurring unit ($R^*_{PEEK}$) is no more than about 50 mol %, no more than about 40 mol %, no more than about 35 mol % or no more than about 30 mol %. As used herein, the relative concentration of recurring unit ($R^*_{PEEK}$) to the total number of recurring unit ($R_{PEEK}$)+($R^*_{PEEK}$), as defined above, is also referred to as the degree of functionalization. Namely, the recurring units ($R^*_{PEEK}$) are, in some embodiments, formed by functionalization of recurring units ($R_{PEEK}$), as described below.

The degree of functionalization can be measured using proton nuclear magnetic resonance ("$^1$HNMR") spectroscopy. $^1$HNMR samples can be prepared using an appropriate solvent/solvent blend. For example, for sulfonated PEEK, $^1$HNMR can be prepared by dissolving the sulfonated PEEK in dichloroacetic acid at elevated temperature and forming a room temperature solution of PEEK in $CDCl_3$ (e.g. at a ratio of 1:1-7:1 w/v $CDCl_3$:dichloroacetic acid). Solvent suppression $^1$HNMR can then be performed to remove the contribution of the dichloroacetic acid proton in the resulting spectrum. Other methods of measuring the degree of functionalization include titration and elemental analysis. However, such methods are susceptible to relatively large inaccuracies. Titration and elemental analysis based methods are highly sensitive to the presence of impurities such as acids that can be left over from the blocky functionalized PEEK copolymer synthesis (e.g., unreacted quantities of functionalization agent). The impurities can lead to significantly overestimated degrees of functionalization because they incorrectly measure the acidic impurities (e.g., unreacted quantities of functionalization agent) as functionalized PEEK copolymer units (e.g., recurring unit ($R^*_{PEEK}$), as demonstrated below in the Examples.

Recurring units ($R_{PEEK}$) is represented by the following formula:

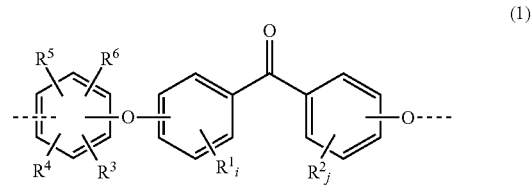

(1)

where $R^1$ and $R^2$, at each instance, are independently selected from the group consisting of a halogen, an alkyl, an alkenyl, an alkynyl, an aryl, an ether, a thioether, a carboxylic acid, an ester, an amide, an imide, an alkali or an alkaline earth metal sulfonate, an alkyl sulfonate, an alkali or alkaline earth metal phosphonate, an alkyl phosphonate, an amine and a quaternary ammonium; i, j and k are independently selected integers from 0 to 4; and $R^3$, $R^4$, $R^5$ and $R^6$ are independently selected from the group consisting of a hydrogen, a halogen, an alkyl, an alkenyl, an alkynyl, an aryl, an ether, a thioether, a carboxylic acid, an ester, an amide, an imide, an alkali or an alkaline earth metal sulfonate, an alkyl sulfonate, an alkali or alkaline earth metal phosphonate, an alkyl phosphonate, an amine and a quaternary ammonium. As used herein, a dashed bond indicates a bond to an adjacent recurring unit. Furthermore, as used herein, a halogen refers to an atom selected from the group consisting of fluorine, chlorine, bromine, iodine, and astatine.

Recurring units (R*$_{PEEK}$) is represented by the following formula:

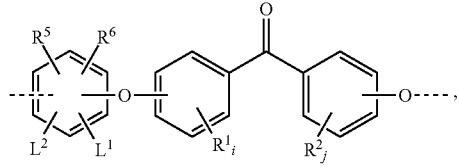
(2)

where i, j, R$^5$, R$^6$ and each R$^1$ and R$^2$ are identical to those selected for recurring unit (R$_{PEEK}$); L$^1$ is —SO$_3$M, —Br or is the same as R$^3$ selected for recurring unit (R$_{PEEK}$), L$^2$ is —SO$_3$M' or —Br, or is the same as R$^4$ selected for recurring unit (R$_{PEEK}$); M and M' are independently selected from the group consisting of hydrogen, Group IA elements and alkali earth metal elements; and either (a) L$^1$ is —SO$_3$M or —Br or (b) L$^2$ is —SO$_3$M' or Br. Examples of Group IA elements include, but not limited to, Li, Na, K, and Cs. Examples of alkali earth metals include, but are not limited to, Ca and Mg. Preferably, L$^1$ is —SO$_3$M.

The person of ordinary skill in the art will recognize that the structures of recurring unit (R$_{PEEK}$) and recurring unit (R*$_{PEEK}$) are linked. As described in detail below, in one embodiment, the blocky functionalized PEEK copolymers are synthesized by functionalization of PEEK polymers (polymers or copolymers). Accordingly, the structure and composition of the original PEEK polymers is preserved when functionalized to synthesize the corresponding blocky functionalized PEEK copolymer, except for the fact that some of the recurring units of the original PEEK polymer are functionalized. For example, referring to Formulae (1) and (2) above, once a selection is made for i, j, R$^5$, R$^6$ and each R$^1$ and R$^2$ for either recurring unit (R$_{PEEK}$) or recurring unit (R*$_{PEEK}$), the same selection is present for recurring unit (R*$_{PEEK}$) and recurring unit (R$_{PEEK}$), respectively.

In some embodiments, recurring unit (R$_{PEEK}$) is represented by the following formula:

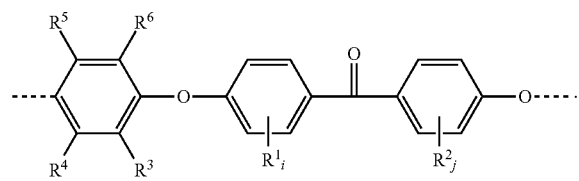
(3)

In some such embodiments, each i is zero. In additional or alternative embodiments, recurring unit (R*$_{PEEK}$) is represented by the following formula:

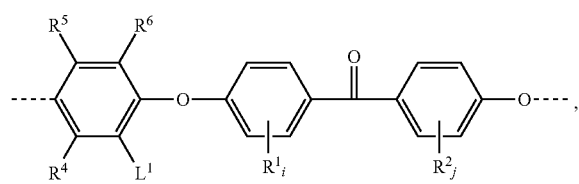
(4)

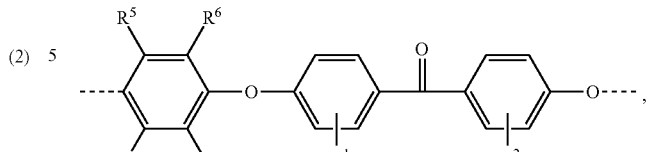
(5)

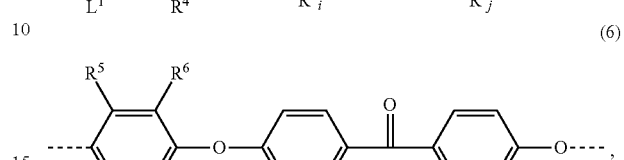
(6)

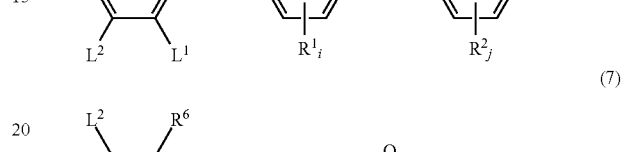
(7)

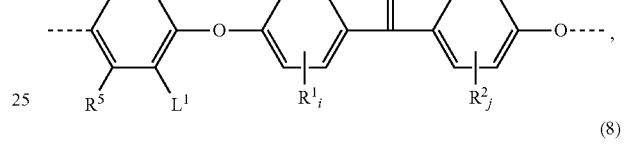
(8)

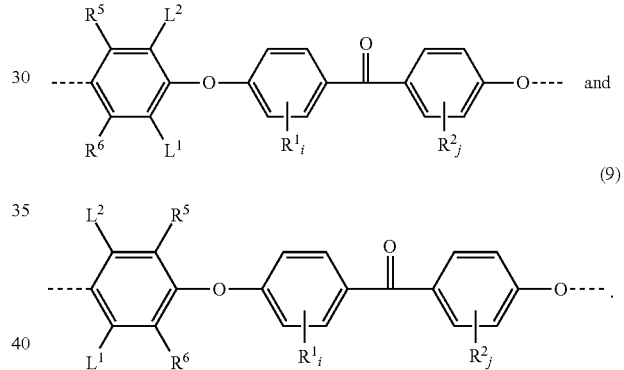
(9)

and

In some such embodiments, each i and j are zero and R$^3$ to R$^6$ are hydrogen. Additionally, in some such embodiments, L$^1$ is —SO$_3$M and L$^2$ is the same as R$^4$ or is —SO$_3$M'.

The blocky functionalized PEEK polymers described herein can have a number average molecular weight ("Mn") of from about 30,000 g/mol to about 60,000 g/mol and a weight average molecular weight ("Mw") of from about 60,000 g/mol to about 132,000 g/mol.

In conjunction with the high degrees of functionalization, the blocky functionalized PEEK copolymers can have high degrees of crystallinity. The blocky functionalized PEEK copolymers can have a degree of crystallinity that is at least about 10%, at least about 15%, at least about 20%, at least about 25% or at least about 28%. Additionally or alternatively, the blocky functionalized PEEK copolymers can have a degree of crystallinity that is no more than about 50%, no more than about 45%, no more than about 40%, no more than about 35% or no more than about 30%. The degree of crystallinity can be determined by dividing the melting enthalpy ("ΔH$_f$") of the blocky functionalized PEEK by the melting enthalpy of a pure crystal of PEEK. The melting enthalpy of the blocky functionalized PEEK copolymer can be measured using Differential Scanning calorimetry ("DSC"), by heating the PEEK samples from 0° C. to 390° C. using a ramp rate of 10° C./min. The melting enthalpy is determined from the area under the curve of the melting endotherm from the first heat (e.g., following precipitation of the blocky functionalized PEEK in water). The melting enthalpy of pure crystalline PEEK was taken as 130 Joules/gram ("J/g"), as reported in Blundell, D. J. and Osborn, B. N., *Polymer* 1983, 24, 953-958, incorporated by reference herein.

Synthesis of Blocky Functionalized PEEK Copolymers

It was surprisingly found that the blocky functionalized PEEK copolymers described herein having high degrees of crystallinity and functionalization can be formed by functionalizing PEEK polymers in the gel state in a non-solvent environment. As used herein, a PEEK polymer includes at least 50 mol % recurring unit ($R_{PEEK}$), as described above in Formulae (1) and (3).

The synthesis method includes functionalizing a PEEK polymer in the gel state. The functionalization process functionalizes the recurring unit ($R_{PEEK}$) in the PEEK polymer to form recurring unit ($R^*_{PEEK}$) in the blocky functionalized PEEK copolymer. The PEEK gel contains a PEEK polymer and a gel solvent. As mentioned above, the gel solvent is selected such that it is a solvent for PEEK above the gelation temperature and forms a gel with PEEK above the functionalization temperature. Desirable gel solvents include, but are not limited to, halogenated carboxylic acids. Examples of desirable halogenated carboxylic acids include, but are not limited do, dichloroacetic acid ("DCA") and trichloroacetic acid. Excellent results were obtained using DCA as a solvent.

Formation of the PEEK gels involves dissolving PEEK in the gel solvent at a temperature above the gelation temperature to form a solution. The solution can then be equilibrated at an equilibration temperature at or below the gelation temperature to allow the gel to form. For the synthesis of blocky functionalized PEEK copolymers described herein, desirable PEEK gels can have a PEEK concentration of at least about 1 w/v %, at least about 10 w/v %, at least about 15 w/v %, at least about 20 w/v %, at least about 21 w/v %, at least about 22 w/v %, at least about 23 w/v %, at least about 24 w/v % or at least about 25 w/v %, relative to the gel solvent. In such embodiments, the PEEK gel can have a PEEK concentration up to the solubility limit of PEEK in the solvent at the equilibration temperature. In further such embodiments, the PEEK gel can have a PEEK concentration of no more than about 40 w/v %, no more than about 35 w/v % or no more than about 30 w/v %, relative to the gel solvent. In some embodiments, it was discovered that functionalization of PEEK gels having a PEEK concentration of greater than about 20 w/v % are more stable (less susceptible to dissolution) during functionalization, relative to PEEK gels having a PEEK concentration less than about 20 w/v %. Accordingly, in some embodiments, blocky functionalized PEEK copolymers formed from PEEK gels having a PEEK concentration of greater than about 20 w/v/% can have higher degrees of functionalization with increased blocky structure relative to those formed from PEEK gels having a PEEK concentration of about 20 w/v % or less.

The functionalization is performed by contacting (e.g. reacting) the PEEK gel with a functionalization agent in a reaction mixture containing the non-solvent for PEEK. As described above, it was surprisingly found that functionalization of PEEK in the gel state in a non-solvent environment can form blocky functionalized PEEK copolymers having high degrees of crystallinity in conjunction with high degrees of functionalization. The non-solvent is selected to have the following properties: (i) it is a non-solvent for PEEK and (ii) it is a solvent for the functionalization agent at least at the functionalization temperature and preferably at room temperature. In some embodiments, the non-solvent can be selected such that, additionally, it is miscible with the gel solvent in the PEEK gel. Desirable non-solvents include, but are not limited to, halogenated alkanes. Such non-solvents are particularly desirable in embodiments in which the PEEK gel solvent is a halogenated alkane and the non-solvent is selected to be miscible with the gel solvent. In general, halogenated alkanes are miscible with halogenated carboxylic acids (PEEK gel solvent). Desirable halogenated alkanes include, but are not limited to, those represented by the formula $C_{n'}H_{m'}X^1_{p'}$, where p' is an integer from 1 to 6; n' is an integer from 1 to 8 and m' is an integer from 1 to 17, such that 4n'-2(n'-1)=m'+p'. Desirable halogenated alkanes include, but are not limited to, chloroform and 1,2-dichloroethane ("DCE").

As used herein, a functionalization agent refers to a chemical compound that can react with recurring unit ($R_{PEEK}$) of PEEK in the gel state to form corresponding recurring unit ($R^*_{PEEK}$). Accordingly, the functionalization agent incorporates the group $—SO_3—$ or $—Br$ of $L^1$ and $L^2$, described above with respect to Formulae (2) and (4)-(9). Desirable functionalization agents include, but are not limited to, those represented by the group of formulae consisting of the following formulae:

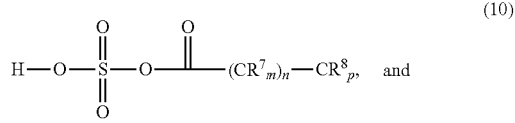

(10)

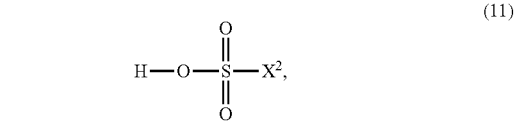

(11)

where each $R^7$ and $R^8$ is independently selected at each instance from the group consisting of a halogen, an alkyl, an alkenyl, an alkynyl, an aryl, an ether, a thioether, a carboxylic acid, an ester, an amide, an imide, an alkali or an alkaline earth metal sulfonate, an alkyl sulfonate, an alkali or alkaline earth metal phosphonate, an alkyl phosphonate, an amine and a quaternary ammonium; m is an integer from 0 to 2; n is an integer from 0 to 20; p is an integer from 0 to 3; and $X^2$ is a halogen. In some embodiments, each $R^8$ is a halogen. In some such embodiments, n is from 1 to 15, 1 to 10, or 1 to 5. Excellent results were obtained with trifluoroacetyl sulfate ("TFAS") (Formula (5) with n=0, p=3, and each $R^8$ is fluorine F), acetyl sulfate (Formula (5) with n=0 and p=0) and chlorosulfonic acid (Formula (6), where $X^2$ is CO as the functionalization agent.

The concentration of the functionalization agent relative to the PEEK polymer can be from about 30 mol % to about 500 mol %, to about 450 mol %, to about 250 mol %, to about 100 mol %, to about 70 mol % or to about 50 mol %, relative to the number of repeat unit ($R_{PEEK}$) in the PEEK polymer.

In some embodiments, the reaction mixture can be formed by combining a PEEK gel suspension with a functionalization solution. In such embodiments, the PEEK gel suspension contains the PEEK gel suspended in the non-solvent. The concentration of the PEEK in the suspension can be from about 1 w/v % or about 5 w/v % to about 10 w/v %, relative to the non-solvent. The functionalization agent can then be added to the PEEK gel suspension to form the reaction mixture. In some embodiments, the functionalization agent can be incorporated into a functionalization solution including the functionalization agent and a non-solvent, having the same or different compositions than the non-solvent used in the PEEK gel suspension, but having the same selection criteria as detailed above. In such embodiments, the functionalization solution can be added to the PEEK gel suspension to form the reaction mixture. In other embodiments, (i) a suspension can be formed from the PEEK gel and the functionalization agent added directly to the suspension or (ii) a solution can be formed with functionalization agent and the PEEK gel can be added to the solution. Based upon the present disclosure, a person of ordinary skill in the art will be able to implement alternative methods for performing the contacting.

The PEEK can be reacted with the functionalization agent at a reaction temperature ("functionalization temperature") suitable to perform the functionalization reaction. Because it was surprisingly found that the non-solvent environment increases the stability of the PEEK gel during functionalization relative to corresponding methods incorporating a solvent environment, the presently described method allows for higher functionalization temperatures. Accordingly, functionalization reactions rates are increased resulting in blocky PEEK polymers have increased degrees of functionalization. In some embodiments, the functionalization temperature can be any temperature below the lowest boiling point of the non-solvent or gel solvent. In some embodiments, the functionalization temperature can be at least about 40° C. or at least about 50° C. Additionally or alternatively, the functionalization temperature can be no more than about 100° C. or no more than about 90° C. Based upon the present disclosure, a person of ordinary skill in the art will know how to select an appropriate functionalization temperature based upon the components of the reaction mixture.

Following functionalization, the blocky functionalized PEEK copolymer can be recovered as a solid by, for example, precipitation into water or reformed into a gel or aerogel by methods well known in art. In some embodiments, a membrane can be formed from the functionalized block PEEK polymer.

Membranes and Other Applications

Membranes containing the blocky functionalized PEEK copolymers can be desirably used in electrochemical application settings. Such membranes can have desirable mechanical properties and ion-conductivities, which are highly desirable in fuel cell applications. The membranes can be formed by solution casting. In some embodiments, the blocky functionalized PEEK copolymers can be desirable super-acid catalysts.

Membranes containing the blocky functionalized PEEK copolymers described herein can have improved mechanical properties relative to membranes currently in use in electrochemical application settings. Membranes formed form the blocky functionalized PEEK copolymer can have a modulus from about 1.5 GPa to about 4.1 GPa and a tensile strength of from about 25 MPa to about 105 MPa, preferably from 50 MPa to about 105 MPa. Modulus and tensile strength can be determined according to ASTM D638 using Type IV dimensions, a gage length of 25 mm and a strain rate of 25 mm/min.

Furthermore, the membranes have desirable water uptake and proton conductivities. The membranes can have a proton conductivity of at least about 10 milliSiemens per cm ("mS/cm"), at least about 20 mS/cm, at least about 50 mS/cm, at least about 90 mS/cm, at least about 100 mS/cm, or at least about 110 mS/cm to about 200 mS/cm. The membranes can be used in electrochemical application settings including, but not limited to, fuel cells (proton exchange membrane), water electrolyzers (proton exchange membrane), redox flow batteries (polymer electrolyte), lithium ion batteries (polymer electrolyte), and in chlor-alkali production (cation exchange membrane). Proton conductivities can be measured using a two-point probe, as further explained in the examples below.

Membranes can be formed from the blocky functionalized PEEK copolymers by solution casting. It was surprisingly found that solution casting, in conjunction with specifically selected solvents, can preserve the crystallinity of the blocky functionalized PEEK copolymer in the membrane. In some embodiments, the crystallinity of the blocky functionalized PEEK copolymer can be in the same ranges as described above. The casting solution contains the blocky functionalized PEEK copolymer dissolved in a solvent. The solvent can be cast by solution casting onto a heated substrate or by spin coating the solution to form a membrane. Desirable solvents include, but are not limited to, halogenated phenols. Excellent results were obtained with 4-chlorophenol. The membranes of interest herein have an average thickness of at least 10 microns, at least 25 microns, at least 50 microns, at least 80 microns or at least 90 microns. In such embodiments, the membranes have an average thickness of no more than about 200 microns, or no more than about 180 microns, or no more than about 170 microns or no more than about 160 microns. The average thickness can be measured using techniques well known in the art including, but not limited to, profilometry.

The resulting membranes can be processed to be free of pinholes. In polymer electrolyte membranes, one common failure mode is gas crossover caused by pinhole formation in the polymer electrolyte membrane (as part of the membrane electrode assembly). For example, the presence of pinholes in the membrane allows hydrogen and oxygen to pass through the membrane and reach the cathode, where the gas can react with the cathode material and cause degradation of the cathode. As used herein, pinhole free membranes are those that have a pinhole concentration of less than about 1 part per million ("ppm"), preferably less than 1 part per billion ("ppb"), relative to the surface area of the membrane.

Should the disclosure of any patents, patent applications, and publications which are incorporated herein by reference conflict with the description of the present application to the extent that it may render a term unclear, the present description shall take precedence.

EXAMPLES

The following examples demonstrate the formation of PEEK gels, and the synthesis of characterization of functionalized PEEK in the gel state.

In the examples, the PEEK polymer used consisted of a recurring monomer unit ($R_{PEEK}$) according to Formula (1), with i and j equal to zero and $R^3$-$R^6$ all selected to be hydrogen. Unless explicitly noted otherwise, the PEEK polymer had a $M_n$ of 34,000 g/mol and a $M_w$ of 69,000 g/mol.

PEEK gels were formed from PEEK solutions. The PEEK solutions were formed from PEEK and dichloroacetic acid ("DCA"). In particular, PEEK was added to an amount of DCA maintained at a temperature of 185° C. After the PEEK dissolved, the solution was immediately removed from the heat source and allowed to equilibrate a selected equilibration temperature for a selected equilibration time. Gel formation was determined by turning the sample vials upside-down after the selected equilibration time. Samples that did not visually exhibit any flow were determined to be a gel.

PEEK functionalization was performed by breaking-up the PEEK gels, formed as described above, into smaller domains and adding them to DCA (solvent), chloroform (non-solvent) or 1,2-dichloroethane ("DCE") (non-solvent) to form the suspensions. The suspensions were allowed to equilibrate at a selected equilibration temperature under a nitrogen atmosphere for at least 1 hour. Functionalization involved adding, dropwise, a 2 vol % solution of trifluoroacetyl sulfate ("TFAS") (functionalization agent) in DCA (for suspensions in DCA), chloroform (for suspensions in chloroform) or DCE (for suspensions in DCE) to the equilibrated suspension, which was maintained at the selected reaction temperature for a selected reaction time. The reaction time was selected from the initial addition of the TFAS into the equilibrated suspension. At the end of the reaction time, the functionalized PEEK was isolated by precipitating the reaction suspension into cold RO water. Following precipitation, the product was filtered, washed with excess purified water (purified by reverse osmosis "RO water"), and purified by soxhlet extraction over methanol for 24 hours. The product was then dried at 80° C. under vacuum for 12 hours.

Gels were formed from the functionalized PEEK by dissolving the isolated functionalized PEEK by in DCA at 185° C. to form a PEEK/DCA solution. Immediately following dissolution, the PEEK/DCA solution were removed from the heat source, which was keeping the solution at 185° C., and allowing the PEEK/DCA solution to equilibrate at room temperature for a period of 14 days. Gel formation was determined as described above.

Unless explicitly noted otherwise, the degree of functionalization was determined from $^1$H-NMR spectra of the samples after the selected reaction time. Functionalized PEEK samples were dissolved in DCA at 175° C. to yield a 10 w/v % solution. The solution was allowed to cool to room temperature and then $CDCl_3$ was added to the solution at ratios from 1:1 $CDCl_3$:DCA (v/v) to 7:1 $CDCl_3$:DCA (v/v). Solvent suppression $^1$HNMR using a 600 MHz Bruker Avance III was then performed to remove the DCA proton peak at 6.04 ppm and elucidate the functionalized PEEK protons. The degree of functionalization was determined by comparing the ratio of the integration of the proton at 7.77 ppm, which corresponds to a proton on the functionalized aromatic repeat unit (e.g. those corresponding to ($R^*_{PEEK}$)), to the integration of the four protons at 7.85 ppm, which correspond to protons on unfunctionalized aromatic repeat units (e.g. those corresponding to ($R_{PEEK}$)).

Example 1: Effect of PEEK Concentration on Gel Formation

The present example demonstrates the dependence of PEEK gel formation on PEEK solution concentration.

To demonstrate gel formation, samples were formed from PEEK/DCA solutions having a concentration from about 6.0 weight/volume % ("w/v %") to about 26.0 w/v % PEEK in 10 mL of dry DCA. After the PEEK dissolved, the solutions were equilibrated using an equilibration temperature of room temperature (25° C.) and an equilibration time of 14 days. Gel testing was done by monitoring the solution constantly for the first 20 min., then every 30 min. for the subsequent 3 hours, and then on an hourly basis until gel formation occurred. If gelation was not observed after the equilibration time, testing was discontinued. The gel formation results are displayed in Table 1, below.

TABLE 1

| Sample No. | PEEK Concentration in DCA (wt. % (w/v)) | Gelation (yes/no) | Time to Gelation (days) |
|---|---|---|---|
| 1 | 6.0 | No | — |
| 2 | 6.5 | No | — |
| 3 | 7.0 | No | — |
| 4 | 8.0 | No | — |
| 5 | 9.0 | Yes | 13 |
| 6 | 10.3 | Yes | 4 |
| 7 | 12.0 | Yes | 3 |
| 8 | 15.2 | Yes | 2 |
| 9 | 18.1 | Yes | 2 |
| 10 | 20.7 | yes | 0.50 |
| 11 | 22.1 | yes | 0.06 |
| 12 | 24.0 | yes | 0.02 |
| 13 | 26.0 | yes | 0.02 |

Referring to Table 1, for the samples tested, samples formed from lower concentration PEEK solutions generally had longer gelation times, relative to samples formed from higher concentration PEEK solutions. For samples 1 to 4, gelation was not observed after 14 days of equilibration. For samples formed with PEEK solutions having a PEEK concentration of 9 wt. % or greater (samples 5-13), gelation was observed, with higher concentration PEEK solutions generally forming gels more quickly than those formed from PEEK solutions having lower PEEK concentrations. The gels having a fast gelation time are of particular interest like the ones having a concentration above 20% that have a gelation time lower than 8 hours.

Example 2: Effect of Temperature on Gel Formation

This example demonstrates the effect of temperature on PEEK gel formation.

To demonstrate the effect of temperature, samples were formed from PEEK/DCA solutions having a PEEK concentration of about 9.3 w/v % to about 26.1 w/v % PEEK in 10 mL DCA. After dissolution of the PEEK, the samples were equilibrated using an equilibration temperature ranging from about 10° C. to about 150° C. and an equilibration time of up to 14 days. The samples were subsequently tested for gel formation. Samples parameters and gel testing results are displayed in Table 2, below:

TABLE 2

| Sample No. | Temperature (° C.) | PEEK Concentration in DCA (wt % (w/v)) | Gel (yes/no) | Time to gel (days) |
|---|---|---|---|---|
| 14A | 10 | 10.5 | yes | 10 |
| 14B |  | 25.9 | yes | 0.05 |
| 15A | 20 | 10.2 | yes | 4 |
| 15B |  | 26.0 | yes | 0.02 |
| 16A | 30 | 10.0 | yes | 8 |
| 16B |  | 26.1 | yes | 0.02 |
| 17A | 45 | 10.2 | yes | 7 |
| 17B |  | 26.1 | yes | 0.04 |
| 18A | 60 | 11.0 | yes | 2 |
| 18B |  | 25.5 | yes | 0.02 |
| 19A | 80 | 9.3 | yes | 2 |
| 19B |  | 25.5 | yes | 0.02 |
| 20A | 100 | 10.2 | yes | 2 |

TABLE 2-continued

| Sample No. | Temperature (° C.) | PEEK Concentration in DCA (wt % (w/v)) | Gel (yes/no) | Time to gel (days) |
|---|---|---|---|---|
| 20B | | 25.4 | yes | 0.013 |
| 21A | 120 | 10.5 | yes | 2 |
| | | — | — | — |
| 22A | 130 | 10.0 | no | — |
| 22B | | 25.0 | yes | 0.02 |
| 23A | 140 | 10.0 | no | — |
| 23B | | 25.5 | yes | 0.04 |
| 24B | 150 | — | — | — |
| | | 25.0 | no | — |

Referring to Table 2, for the samples tested, the gelation rate increased (shorter gelation times) with temperature. For example, samples 14A-21A were equilibrated at increasing temperatures, respectively, and the corresponding gelation rates dropped from 10 days to 2 days, though no change in the gelation rate was observed with equilibration temperatures from 60° C. (sample 18A) to 120° C. (sample 21A). Similarly, samples 14B-20B were equilibrated at increasing temperatures, respectively, and the corresponding gelation rates dropped form 0.05 days to 0.013 days.

Furthermore, for the samples tested, samples formed from higher concentration PEEK solutions were able to form gels at higher temperature, relative to samples formed from lower concentration PEEK solutions. Referring again to Table 2, samples formed from PEEK solutions having approximately 10 wt. % PEEK (samples 14A-23A) did not form gels when the equilibration temperature was more than about 120° C. Sample formed from PEEK solutions having approximately 25 wt. % PEEK (14B-20B and 22B-24B) did not form gels when the equilibration temperature was more than about 140° C. The lower equilibration temperature testing was limited by the melting point of DCA (about 9° C.). One more time, it appears that concentration of PEEK in the gel above 20% are of particular interest.

Example 3: Stability of PEEK Gels During Functionalization

This example demonstrates the stability of PEEK gels during functionalization.

To demonstrate stability, PEEK gel samples were formed by dissolving 5 g of PEEK in dry DCA to form PEEK/DCA solutions have a PEEK concentration from about 14.3 w/v % to about 20.0 w/v %. After dissolution of the PEEK, the samples were equilibrated using an equilibration temperature of room temperature and an equilibration time of 3 days.

For functionalization, the PEEK gels were broken-up and added to dry DCA to form suspensions having a PEEK concentration of 6.7 w/v %. The suspensions were equilibrated at the reaction temperature of 60° C. Functionalization was performed by adding TFAS (as a solution with DCA) to the equilibrated suspension in a 1:1 molar ratio with respect to the number of moles of PEEK recurring units (e.g. ($R_{PEEK}$)). This ratio was calculated by determining the moles of PEEK monomer that are present in the 5 g sample. Then, TFAS was prepared so that the moles of TFAS were equivalent to the moles of PEEK monomer in the suspension. The reaction time was selected as the time it took for the PEEK gel to completely dissolve in the DCA. Because each gel dissolved, the reaction time is taken as a measure of the stability, with longer reaction times indicating greater stability. The results of the stability testing are demonstrated in Table 3, below.

TABLE 3

| Sample No. | PEEK Concentration in DCA (wt % (w/y)) | Stability at 60° C. (min) |
|---|---|---|
| 25 | 14.3 | 75 |
| 26 | 16.7 | 115 |
| 27 | 20.0 | 135 |

For those tested, samples formed from high concentration gels were more stable during functionalization, relative to samples formed from lower concentration gels. Referring to Table 3, sample 25 (14.3 wt. % PEEK solution) had a gel stability of about 75 minutes while that of samples 26 (16.7 wt. % PEEK solution) and 27 (20.0 wt. % PEEK solution) were 115 and 135 minutes respectively. Accordingly, because increased stability is associated with higher degrees of functionalization (longer reaction times), samples 25-27 had increasing degrees of functionalization, respectively, in the gel state (see Example 4).

Example 4: Effect of Non-Solvent on Gel Stability and Degree of Functionalization The example demonstrates the effect of non-solvent on gel stability during functionalization and increased degrees of functionalization.

To demonstrate stability, PEEK gels were formed as described in Example 3 to a final concentration of 20 w/v %. Functionalization involved dissolving the PEEK gels in DCA (solvent), chloroform (non-solvent) or DCE (non-solvent) to form suspensions having a PEEK concentration of about 6.7 w/v %. The suspensions were equilibrated at an equilibration temperature of about 60° C. or about 80° C. Functionalization was performed by adding the corresponding TFAS solution to the suspension (see above). The selected reaction temperature was identical to the selected equilibration temperature and the selected reaction time was up to 24 hours. For some samples, the suspended PEEK gel dissolved prior to the selected reaction time. For such samples, the reaction time was taken as the time it took the PEEK gel to completely dissolve.

Sample parameters as well as stability and functionalization results are displayed in Table 4, below. In Table 4, "Indefinite" refers to the fact that there was no visible dissolution of the gel during the selected reaction time.

TABLE 4

| Sample No. | Gel Concentration (w/v %) | Reaction Solvent | Reaction Temperature (° C.) | Amount of TFAS Added (mol %) | Reaction Time (hr) | Time Until Complete Gel Dissolution (hr) | Degree of Functionalization (mol %) |
|---|---|---|---|---|---|---|---|
| 28 | 20.0 | DCA | 80 | 85 | 2.5 | 2.5 | 8.3 |
| 29 | 20.0 | DCA | 80 | 80 | 3.0 | 3.0 | 7.8 |
| 30 | 20.0 | DCA | 80 | 75 | 4.0 | 4.0 | 8.0 |
| 31 | 20.0 | $CHCl_3$ | 60 | 100 | 8.5 | Indefinite | 7.6 |
| 32 | 20.0 | 1,2-DCE | 80 | 80 | 20 | Indefinite | 14.3 |

TABLE 4-continued

| Sample No. | Gel Concentration (w/v %) | Reaction Solvent | Reaction Temperature (° C.) | Amount of TFAS Added (mol %) | Reaction Time (hr) | Time Until Complete Gel Dissolution (hr) | Degree of Functionalization (mol %) |
|---|---|---|---|---|---|---|---|
| 33 | 20.0 | 1,2-DCE | 80 | 80 | 24 | Indefinite | 18.4 |

For those tested, samples functionalized in a non-solvent were more stable and exhibited high degrees of functionalization relative to corresponding samples functionalized in a solvent. Referring to Table 4, samples 31-33 (DCA solvent) completely dissolved after 2.5, 3.0 and 4.0 hours, respectively, while samples 31-33 (non-solvent) did not show any visible dissolution after 8.5, 20 and 24 hours, respectively. Furthermore, samples 32 and 33 (non-solvent) exhibited an 83% and 136% increase in the degree of functionalization (14.3 mol % and 18.4 mol %, respectively) relative to corresponding sample 29 (7.8 mol %). The results demonstrate that functionalization in a non-solvent surprisingly led to significantly increased gel stability and, correspondingly, surprisingly increased degrees of functionalization.

Example 5: Characterization of Crystallinity

The present example demonstrates the effect of non-solvent functionalization on functionalized PEEK crystallinity.

To demonstrate crystallinity, PEEK gel samples were formed as described in Example 4. Functionalization was performed also as described in Example 4 by forming a suspension having 6.7 w/v % PEEK in DCE. The selected equilibration temperature was 80° C. and the selected equilibration time was 1 hour. The selected reaction temperature was 80° C. and the selected reaction time was 24 hours. 79 mol % or 80 mol % TFAS (relative to the number of moles of the PEEK recurring units) was added to the equilibrated suspensions as a 2 v/v % solution in DCE, relative to the amount of PEEK in the suspension. For each sample in each sample set, TFAS was added to the suspensions over from about 140 min. to about 224 min. Following functionalization, degree of functionalization, melting temperatures ("$T_{m1}$" and "$T_{m2}$"), and relative crystallinities ("% $X_{c1}$" and "% $X_{c2}$"), and the total crystallinity ("% $X_c$"=% $X_{c1}$+% $X_{c2}$). % $X_{c1}$ and % $X_{c2}$ were determined as described above (e.g. DHf1/130 and DHF2/130, respectively). Maximum and minimum values for the results of each sample set, as well as sample parameters, are displayed in Table 5, below.

TABLE 5

| Sample Set | Degree of Functionalization (mol %) | Amount of TFAS (mol %) | $T_{m1}$ (° C.) | % $X_{c1}$ (%) | $T_{m2}$ (° C.) | % $X_{c2}$ (%) | Total % $X_c$ (%) |
|---|---|---|---|---|---|---|---|
| 1 | 17.9-21.9 | 78 | 225-239 | 1.6-2.1 | 315-317 | 14.0-21.7 | 15.6-23.8 |
| 2 | 18.7-25.3 | 80 | 228-238 | 3.5-4.5 | 316-319 | 14.3-25.0 | 18.3-28.5 |

Referring to Table 5, the results demonstrate PEEK having degrees of functionalization up to 25.3% in conjunction with crystallinities of up to 28.5%. Referring to sample set 2, at least one sample from that sample set had both a degree of functionalization 25.3% and crystallinity of 28.5%. Moreover, the samples exhibited two melting temperatures. As noted above, the two melting temperatures are thought to result from different crystallite sizes in the PEEK. In general, for both samples sets, a first melting temperature, lower than the second melting temperature, was associated with a first lower crystallinity, lower than the second crystallinity. For example, samples in sample set 1 had a first melting temperature of 225° C.-239° C. and a first crystallinity of 1.6%-2.1%, respectively lower than the second melting temperature of 315° C.-317° C. and the second crystallinity of 14.0%-21.7%. Similar results were obtained for samples in set 2.

Example 6: Comparison of Functionalization Method on Gel Formation

This example demonstrates the effect of different functionalization methods on the ability of corresponding functionalized PEEK polymers to form gels.

To demonstrate the effect of gel formation, random and blocky functionalized PEEK polymers were formed. To form random functionalized PEEK polymers, PEEK was dissolved in DCA at 185° C. to form solutions containing 6.7 w/v % PEEK. After the PEEK dissolved, the temperature of the solution was reduced to 60° C. 140 mL of sulfuric acid was added to the solution to form a reaction mixture. The reaction mixture was stirred and kept at 60° C. for up to 2 hours to functionalize the PEEK polymer. Following functionalization, the product was isolated by precipitating the reaction suspension into cold RO water. Following precipitation, the product was filtered, washed with excess RO water, and purified by soxhlet extraction over methanol for 24 hours. The product was then dried at 80° C. under vacuum for 12 hours.

Blocky functionalized PEEK polymer was formed as described above. In particular, solutions were formed containing 20 w/v % PEEK in DCA. The solutions were equilibrated using an equilibration temperature of 60° C. and an equilibration time of 1 hour. The resulting gel was used to form a suspension of 6.7 w/v % PEEK in chloroform. Functionalization was performed by adding 100 mol % TFAS (relative to the number of moles of the PEEK monomer recurring units) as 2 vol % solution in chloroform, relative to the amount of PEEK, to the suspension. The selected reaction temperature was 60° C. and the selected reaction time was 8.5 hours. Following functionalization, the product was isolated by precipitating the reaction suspension into cold RO water. Following precipitation, the product was filtered, washed with excess RO water, and purified by soxhlet extraction over methanol for 24 hours. The product was then dried at 80° C. under vacuum for 12 hours.

To attempt gel formation, samples were formed by dissolving 7.5 g of each the isolated random functionalized and blocky functionalized PEEK polymers in 5 mL DCA (15 w/v % of PEEK in DCA) at 185° C. Following dissolution, the samples were allowed to equilibrate at room temperature for 14 days and were subsequently tested for gel formation, as described above. The sample formed from the blocky functionalized PEEK formed a gel while the two samples formed from randomly functionalized PEEK did not form gels.

Example 7: Formation and Characterization of Blocky Functionalized PEEK Membranes This example demonstrates the formation and characterization of blocky functionalized PEEK membranes.

To demonstrate formation, blocky functionalized PEEK ("F-PEEK") (Formula (4), each i and j equal to zero, and $L^1$ equal —$SO_3H$) was synthesized as described in Example 4, except that the reaction temperature was 80° C., 80 mol %, relative to the number of moles of the PEEK monomer repeat units, TFAS was used for functionalization and the reaction time was 24 hours and dissolved in 4-chlorophenol at 160° C. to a final concentration of 10 wt. %. The resulting solution was filtered, degassed and solution cast onto a glass substrate at 100° C. and the coated substrate was allowed to cool to room temperature. The functionalized PEEK membrane formed was pinhole-free, as determined by visual inspection. The average thickness of the resulting membranes was about 23.3 microns. Mechanical performance, degree of functionalization and crystallinity were measured as described above. Mechanical testing was done using an Instatron 5867 Dual Column System mechanical testing apparatus. Analogous testing was performed on membranes formed from Nafion® PFSA (available from DuPont) having an average thickness of about 25 microns, with the exception of Crystallinity, which was obtained from Li, J.; Yang, X.; Tang, H.; Pan, M. *J. Membr. Sci*, 2010, 361, 38-42. The results are displayed in Table 7, below.

TABLE 7

| Sample No. | Membrane Composition | Equivalent Weight (g) | Degree of Sulfonation (mol %) | Modulus (MPa) | Tensile Strength (MPa) | Crystallinity (%) |
| --- | --- | --- | --- | --- | --- | --- |
| 34 | F-PEEK | 1,479 | 20.6 | 2,550 ± 200 | 70.6 ± 8.8 | 22.9 |
| 35 | Nafion® 211 | 990-1,050 | 14.2-15.5 | 449 ± 6 | 27.5 ± 1.3 | 12.4[1] |

Referring to Table 7 and for the samples tested, the F-PEEK membrane (sample 34) had significantly improved functionalization (at least about 33%) and crystallinity (about 85%) relative to the traditional Nafion® PFSA membrane (sample 35). Additionally, the mechanical properties of the F-PEEK membranes similarly showed outstanding improvement over the traditional Nafion® PFSA membranes. For example, the modulus and tensile strength of the F-PEEK membrane was improved by at least about 416% and about 85%, respectively, relative to the Nafion® PFSA membrane.

determine the water uptake, relative to the weight prior to exposing the membrane to boiling water. The results are displayed in Table 8, below. In Table 8, λ is a measure of water uptake, calculated form the values determined by gravimetric analysis, as described in detail above.

TABLE 8

| Sample | Reaction Type | Degree of degree of functionalization (mol %) | $H_2O$ Uptake (wt %) | λ (moles $H_2O$/moles $SO_3$) | Proton Conductivity (mS/cm) |
|---|---|---|---|---|---|
| 36 | Random | 27.0 | 21.1 ± 3.6 | 13.4 ± 2.3 | 4.5 ± 0.8 |
| 34 | Blocky | 20.6 | 37.9 ± 9.4 | 31.1 ± 7.7 | 28.8 ± 3.8 |

Referring to Table 8, sample 37 (blocky functionalized PEEK) had significantly improved water update, λ and proton conductivity, relative to sample 36 (random functionalized PEEK). Notably, notwithstanding the fact that sample 36 had a higher degree of functionalization, sample 37 has significantly increased proton conductivity (about 540%) relative to sample 36. The results demonstrate, among other things, that the blocky functionalization morphology can significantly increase the proton conductivity of resulting membranes.

Example 7: Proton Conductivity Performance of Blocky Functionalized PEEK Membranes This example demonstrates the proton conductivity of random and blocky functionalized PEEK membranes.

To demonstrate performance, blocky functionalized PEEK and random functionalized PEEK membranes were formed as described in Example 4 and Example 6, respectively. Water uptake was measured by boiling the membranes at 100° C. for 1 hr and then placing them in water at room temperature for 12 hours. The membranes had an average thickness of about 24 microns. The degree of functionalization was measured using $^1$HNMR as described above.

Proton conductivity of the membranes were measured using a two-point probe, as is well known in the art. Prior to analysis, the membranes were boiled in water for 1 hour and then soaked in room temperature water overnight. In-plane proton conductivity was conducted using a 2-point conductivity cell which was submersed in deionized water at room temperature. Impedance measurements were taken from 1 Hz to 1.5 MHz using a 1255 HF frequency analyzer coupled with a 1286 electrochemical interface from Solatron. The intercept along the real axis of the Nyquist plot was taken and used to determine the conductivity according to the formula:

$$\sigma = \frac{1}{\rho} = \frac{L}{R \times W \times T}.$$

The water uptake was measured gravimetrically. Water uptake was measured by cutting samples into 1 cm×2.5 cm ribbons and drying them at 80° C. under vacuum overnight. The samples were cooled to room temperature and the dry weight of the each sample was measured. The samples were then immersed in boiling water for 1 hour, followed by immersion in room temperature water for 12 hours. The samples were removed from the water, blotted to remove excess water on the membrane surface, and reweighed to

Example 8: Measurement of Degree of Functionalization

This example demonstrates the measurement of the degree of functionalization for blocky functionalized PEEK copolymers using titration and $^1$HNMR.

To demonstrate the measurement, 6 functionalized PEEK samples were made. Samples 35, 36, 38 and 39 were prepared first preparing a PEEK gel having a concentration of 15 w/v % at a temperature of 170° C. Subsequently, the gel was broken-up and TFAS was added to make a suspension having a PEEK concentration of 5 w/v % and a TFAS concentration of about 1 v/v %, providing a range of relative concentrations of the sulfonating reagent from 200 to 350 mol %, relative to recurring units of PEEK. The functionalization was performed by heating the suspension to maintain a temperature of 65° C. for about 3 hrs. The product was recovered as described above. Samples 36, 39 and 40 were prepared using a PEEK polymer having a $M_n$ of 44,000 g/mol and a $M_w$ of 98,000 g/mol. Sample 37 was prepared from Ketaspire® PEEK KT820NL from Solvay Specialty Polymers USA, L.L.C. (Mn=49,000, Mw=100,000) Samples 35 and 36 were functionalized using a 350 mol % of TFAS, relative to the PEEK recurring unit (e.g. $R_{PEEK}$, above) while samples 38 and 39 were functionalized using 200 mol % of TFAS, again relative to the PEEK recurring unit. Samples 37 and 40 were homogenously functionalized PEEK polymers prepared as described in Example 6 with, respectively, 300 mol % and 200 mol % of TFAS, relative to the PEEK recurring unit, used for the functionalization with the exception that the PEEK polymer used was Ketaspire® PEEK KT820NL from Solvay Specialty Polymers USA, L.L.C.

To measure the degree of functionalization of each sample by back titration, a 0.02 mol/L NaOH aqueous solution was prepared to neutralize the F-PEEK samples. The concentration of the NaOH solution was standardized by titrating the NaOH solution with a 0.02 mol/L benzoic acid aqueous solution. The F-PEEK samples were first ground into powder and weighed on an analytical balance. Then precisely 20 ml of the NaOH solution and 2 ml of methanol was added into each F-PEEK powder sample using a calibrated transfer pipet, ensuring a molar excess of NaOH/F-PEEK. Then the mixture was heated at 80° C. under reflux for 12 hrs. The neutralized F-PEEK mixtures were then cooled room temperature, and a 0.02 mol/L HCl aqueous solution was prepared to titrate the excess NaOH remaining in the F-PEEK/NaOH mixture. The 0.02 mol/L HCl solution was standardized by titrating the standardized 0.02 mol/L NaOH solution. The moles of NaOH consumed by the sulfonic acid groups of the F-PEEK was calculated from the titration result. The degree of functionalization (DoF) was determined by comparing the ratio of the moles of —SO$_3$H groups on the F-PEEK to the moles of PEEK recurring units in the F-PEEK sample. Degree of functionalization measurements by $^1$HNMR were made as described in the above Examples.

The results of the degree of functionalization measurements and percent crystallinity measurements are displayed in Table 9, below. In Table 9, "DoF" indicates degree of functionalization, Tg is the glass transition temperature, Tm is the melting temperature, Tc is the crystallization temperature during the cooling run and $\Delta H_f$ is the heat of fusion relative to pure crystalline PEEK (130 J/g$^2$, as explained above). The error in the titration measurement of degree of functionalization was calculated as 100*(DoF by Titration–DoF by $^1$HNMR)/(DoF by $^1$HNMR).

TABLE 9

| Sample | DoF by Titration (mol %) | DoF by $^1$HNMR (mol %) | Error in Titration (%) | T$_g$ (° C.) | Tm (° C.) | T$_c$ (° C.) | $\Delta H_f$ (J/g) | % Crystallinity |
|---|---|---|---|---|---|---|---|---|
| 35 | 32.4 | 17 | 90.6 | 150 | 337 | 304 | 39.2 | 30.2 |
| 36 | 23.3 | 19 | 22.6 | 153 | 332 | 292 | 36.8 | 28.3 |
| 37 | 29.1 | 12 | 142.5 | 154 | 318 | - | 5.0 | 3.8 |
| 38 | 11.6 | 11 | 5.5 | 147 | 339 | 309 | 48.7 | 37.5 |
| 39 | 17.1 | 10 | 71.0 | 151 | 336 | 302 | 36.4 | 28.0 |
| 40 | 11.3 | 8 | 41.3 | 158 | 319 | - | 0.4 | 0.3 |

Referring to Table 9, titration based methods significantly overestimated values of the degree of functionalization. For the samples tested, titration based methods overestimated the degree of functionalization at least by 41.3% and up to 142%. As explained in detail above, titration based methods are extremely susceptible to the presence of trace acid content in the blocky Functionalized PEEK copolymer. Without being limited by a theory, it is thought that the overestimation in the degree of functionalization is due to a residual concentration of the TFAS used as the functionalization agent.

The embodiments above are intended to be illustrative and not limiting. In addition, although the present invention has been described with reference to particular embodiments, those skilled in the art will recognize that changes can be made in the form and detail without departing from the spirit and scope of the invention. Any incorporation by reference of documents above is limited such that no subject matter is incorporated that is contrary to the explicit disclosure herein.

The invention claimed is:

1. A PEEK copolymer gel comprising a blocky PEEK copolymer and a gel solvent that is a non-solvent for the blocky PEEK copolymer and a solvent for trifluoroacetyl sulfate, wherein the blocky PEEK copolymer comprises:
    (i) recurring unit (R$_{PEEK}$) represented by the following formula:

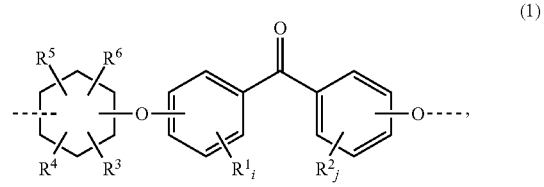

(1)

wherein

R$^1$ and R$^2$ are independently selected at each instance from the group consisting of a halogen, an alkyl, an alkenyl, an alkynyl, an aryl, an ether, a thioether, a carboxylic acid, an ester, an amide, an imide, an alkali or an alkaline earth metal sulfonate, an alkyl sulfonate, an alkali or alkaline earth metal phosphonate, an alkyl phosphonate, an amine and a quaternary ammonium;

R$^3$, R$^4$, R$^5$ and R$^6$ are independently selected at each instance from the group consisting of a hydrogen, halogen, an alkyl, an alkenyl, an alkynyl, an aryl, an ether, a thioether, a carboxylic acid, an ester, an amide, an imide, an alkali or an alkaline earth metal sulfonate, an alkyl sulfonate, an alkali or alkaline earth metal phosphonate, an alkyl phosphonate, an amine and a quaternary ammonium;

i and j are independently selected integers from 0 to 4; and (ii) recurring unit (R*$_{PEEK}$) represented by the following formula:

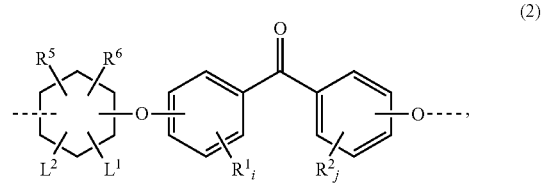

(2)

wherein i, j, R$^5$, R$^6$ and each R$^1$ and R$^2$ are identical to those selected for recurring unit (R$_{PEEK}$);

L$^1$ is the same as R$^3$, —SO$_3$M or —Br,

L$^2$ is the same as R$^4$, —SO$_3$M' or —Br,

M and M' are independently selected from the group consisting of hydrogen, Group IA elements and alkali earth metal elements; and at least one of L$^1$ and L$^2$ is —SO$_3$M or Br, wherein the PEEK copolymer has a degree of functionalization of at least about 20%, as measured by $^1$HNMR spectroscopy and a degree of crystallinity of at least about 10%, as measured by Differential Scanning calorimetry ("DSC") using a ramp rate of 10° C./min and heating from a first temperature of 0° C. to 390° C., wherein the PEEK gel has a PEEK concentration of at least 21 w/v % to 40 w/v %.

2. The PEEK copolymer gel of claim 1, wherein the PEEK copolymer has a degree of functionalization of at least about 22%.

3. The PEEK copolymer gel of claim 1, wherein
i and j equal 0;
$R^3$, $R^4$, $R^5$, and $R^6$ are each hydrogen and
recurring unit ($R*_{PEEK}$) is represented by a formula selected form the following group of formulae:

(4)
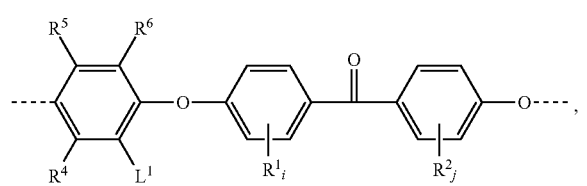

(5)
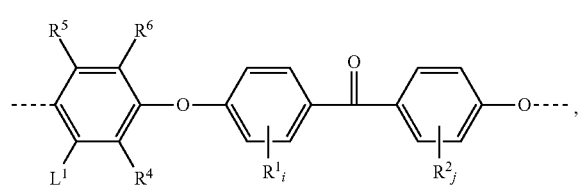

(6)
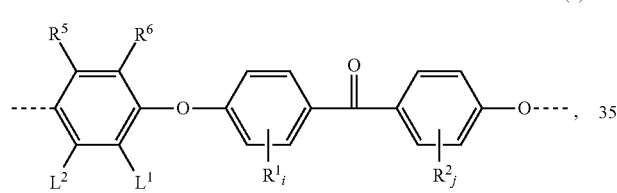

(7)
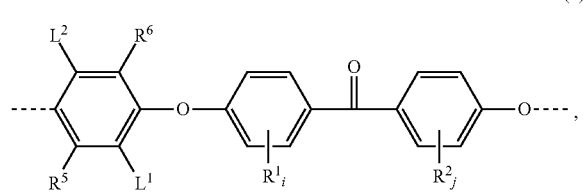

(8)
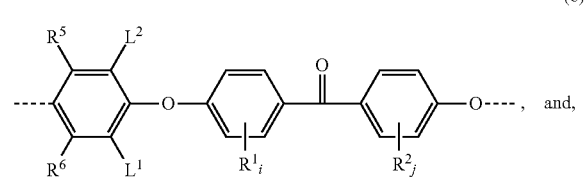

(9)
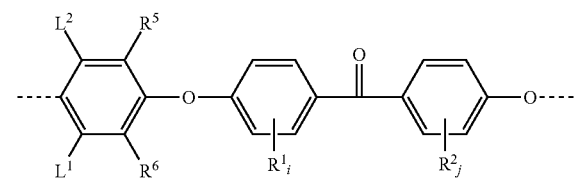

and,
wherein
$L^1$ is —$SO_3M$ or —Br, and
$L^2$ is —$SO_3M'$ or —Br.

4. The PEEK copolymer gel of claim 1, wherein i and j are zero and $R^3$, $R^4$, $R^5$, and $R^6$ are hydrogen.

5. The PEEK copolymer gel of claim 1, wherein $L^1$ is —$SO_3M$, and $L^2$, is the same as $R^4$.

6. The PEEK copolymer gel of claim 1 wherein the gel solvent is dichloroethane acid or trichloroacetic acid.

7. A method for forming the PEEK copolymer gel of claim 1, the method comprising:
contacting, in a reaction mixture, (A) a PEEK gel comprising a PEEK polymer comprising recurring unit ($R_{PEEK}$) and (B) a functionalization agent,
wherein,
the contacting forms the PEEK copolymer gel of claim 1, and
the reaction mixture comprises a liquid that is a non-solvent for the PEEK polymer and is a solvent for the functionalization agent.

8. The method of claim 7, wherein the PEEK gel comprises a gel solvent that is miscible with the liquid.

9. The method of claim 7, wherein the liquid is a halogenated alkane represented by the formula: $C_{n'}H_{m'}X^1_{p'}$, where p' is an integer from 1 to 6; n' is an integer from 1 to 8 and m' is an integer from 1 to 17, such that 4n'-2(n'-1)=m'+p', and the gel solvent is selected from dichloroacetic acid, trichloroacetic acid, and a combination thereof.

10. The method of claim 7, wherein the functionalization agent is represented by a formula selected from the following group of formulae consisting of:

(10)
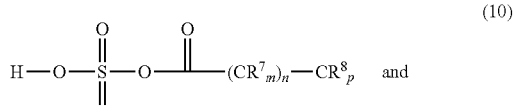
and

(11)
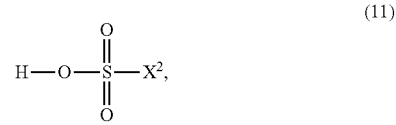

wherein
each $R^7$ and $R^8$ is independently selected at each instance from the group consisting of a halogen, an alkyl, an alkenyl, an alkynyl, an aryl, an ether, a thioether, a carboxylic acid, an ester, an amide, an imide, an alkali or an alkaline earth metal sulfonate, an alkyl sulfonate, an alkali or alkaline earth metal phosphonate, an alkyl phosphonate, an amine and a quaternary ammonium;
m is an integer from 0 to 2;
n is an integer from 1 to 20;
p is an integer from 0 to 3, and
$X^2$ is a halogen; and
wherein $L^1$ is —$SO_3H$.

11. The method of claim 7, wherein the functionalization agent is selected from the group consisting of trifluoroacetyl sulfate, acetyl sulfate, chlorosulfonic acid or any combination thereof.

12. The PEEK copolymer gel of claim 1, wherein the PEEK copolymer has a degree of functionalization of at least about 25%.

13. The PEEK copolymer gel of claim 1, wherein the PEEK polymer has a crystallinity of at least about 20%.

14. The PEEK copolymer gel of claim 1, wherein the PEEK polymer has a crystallinity of at least about 25%.

15. The PEEK copolymer gel of claim 1, wherein $L^1$ is —$SO_3H$, and $L^2$, is the same as $R^4$.

16. The method of claim 7, wherein the liquid is $CHCl_3$ or $ClH_2C-CH_2Cl$, and the gel solvent is selected from dichloroacetic acid, trichloroacetic acid, and a combination thereof.

17. The PEEK copolymer gel of claim 1, wherein the PEEK copolymer has a concentration of recurring units $R_{PEEK}$ of at least 50 mol %, relative to the total number of recurring units $(R_{PEEK})+(R^*_{PEEK})$.

18. The PEEK copolymer gel of claim 1, wherein the PEEK copolymer has a concentration of recurring units $R^*_{PEEK}$ of at least 20 mol % to 50 mol %, relative to the total number of recurring units $(R_{PEEK})+(R^*_{PEEK})$.

* * * * *